US012694721B2

(12) United States Patent
Liu et al.

(10) Patent No.: US 12,694,721 B2
(45) Date of Patent: Jul. 28, 2026

(54) MAINTENANCE MANAGEMENT FOR VEHICLES HAVING NETWORK IOT SENSOR DATA ANALYSIS ENABLED

(71) Applicant: International Business Machines Corporation, Armonk, NY (US)

(72) Inventors: Su Liu, Austin, TX (US); Demetrice L. Browder, Liberty Hill, TX (US); Glen Corneau, Round Rock, TX (US); Diane Basara Britton, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 18/470,228

(22) Filed: Sep. 19, 2023

(65) Prior Publication Data

US 2025/0095409 A1 Mar. 20, 2025

(51) Int. Cl.
*G07C 5/00* (2006.01)

(52) U.S. Cl.
CPC ............. *G07C 5/006* (2013.01); *G07C 5/008* (2013.01)

(58) Field of Classification Search
CPC ........ G07C 5/008; H04L 67/12; G06N 20/00; G06Q 10/20; B60D 1/62; B60W 50/14;
(Continued)

(56) References Cited

U.S. PATENT DOCUMENTS 6,950,782 B2 * 9/2005 Qiao .................. G06F 11/2257 701/40
7,502,672 B1 * 3/2009 Kolls ..................... G06Q 30/06 340/988
(Continued)

FOREIGN PATENT DOCUMENTS

| | | | |
|---|---|---|---|
| CN | 1383521 | A | 12/2002 |
| CN | 103048992 | A | 4/2013 |

(Continued)

OTHER PUBLICATIONS

Precision Tune Autocare, Severe Service Requirements, Sep. 24, 2015, p. 1-3 (Year: 2015).*
(Continued)

*Primary Examiner* — Rachid Bendidi
*Assistant Examiner* — Irene C Khuu
(74) *Attorney, Agent, or Firm* — Yee & Associates, P.C.

(57) ABSTRACT

Dynamic vehicle maintenance management is provided. Performance of each subsystem of a plurality of subsystems corresponding to a vehicle and driving behavior of a user of the vehicle is monitored by performing an analysis of data collected from an IoT sensor system onboard the vehicle to detect any subsystem issues in the vehicle using a set of machine learning models. An issue is detected in a subsystem of the vehicle based on the analysis of the data collected from the IoT sensor system onboard the vehicle. Maintenance corresponding to the issue detected in the subsystem of the vehicle is scheduled at a date, time, and location based on availability of the user of the vehicle and a selected vehicle repair shop. A notification regarding the maintenance corresponding to the issue detected in the subsystem of the vehicle is sent to the user of the vehicle via a network.

20 Claims, 6 Drawing Sheets

(58) Field of Classification Search

CPC ........ H04W 4/40; G10L 15/22; B60T 8/1708; G06F 3/017; G16H 50/20; G08G 1/096725; G05B 23/0283; A61B 5/0022; B60K 35/00; B60L 58/12; G01C 21/3461; G05D 1/0088; G06V 20/58; H04N 7/181; G01L 5/0052; G08B 25/016; B60R 25/00; B60Q 1/52; G01M 17/007; B62D 59/04; B60H 1/00742; B60C 1/00

See application file for complete search history.

(56) References Cited

U.S. PATENT DOCUMENTS

| | | | | |
|---|---|---|---|---|
| 9,738,125 | B1 * | 8/2017 | Brickley | H04W 4/70 |
| 10,380,654 | B2 * | 8/2019 | Hirtenstein | G06Q 30/0283 |
| 10,802,486 | B1 * | 10/2020 | Paul | G07C 5/006 |
| 11,113,905 | B2 | 9/2021 | Korchev et al. | |
| 11,157,973 | B2 * | 10/2021 | Fuchs | G06Q 30/0283 |
| 2003/0055666 | A1 * | 3/2003 | Roddy | G07C 5/008 705/305 |
| 2005/0267774 | A1 * | 12/2005 | Merritt | G06Q 10/0637 705/306 |
| 2016/0035150 | A1 * | 2/2016 | Barfield, Jr. | G05B 23/0254 701/29.3 |
| 2018/0315106 | A1 * | 11/2018 | Leos | G06Q 30/0611 |
| 2019/0012851 | A1 * | 1/2019 | Korchev | G07C 5/0808 |
| 2019/0130669 | A1 * | 5/2019 | Boggio | G05B 23/0254 |
| 2019/0287079 | A1 * | 9/2019 | Shiraishi | G07C 5/0841 |
| 2020/0090132 | A1 * | 3/2020 | Bender | G06F 16/337 |
| 2020/0364950 | A1 * | 11/2020 | Bachant | G07C 5/02 |
| 2021/0150827 | A1 * | 5/2021 | Abramov | G07C 5/0808 |
| 2021/0192872 | A1 * | 6/2021 | Morita | G07C 5/008 |
| 2021/0215491 | A1 * | 7/2021 | Liu | G06Q 50/40 |
| 2021/0287184 | A1 * | 9/2021 | Penilla | G06Q 10/06314 |
| 2021/0398363 | A1 * | 12/2021 | Olalere | G06Q 10/20 |
| 2022/0026879 | A1 * | 1/2022 | Kale | G06N 3/088 |
| 2022/0027963 | A1 | 1/2022 | Isaac | |
| 2022/0165104 | A1 * | 5/2022 | Gardiner | G06Q 30/02 |
| 2022/0398876 | A1 * | 12/2022 | Gumaste | G06F 30/20 |
| 2024/0220981 | A1 | 7/2024 | Ropel et al. | |
| 2025/0095032 | A1 | 3/2025 | Delima et al. | |
| 2025/0095409 | A1 * | 3/2025 | Liu | G07C 5/008 |

FOREIGN PATENT DOCUMENTS

| | | | |
|---|---|---|---|
| CN | 110674126 | B | 12/2020 |
| CN | 114255082 | A | 3/2022 |
| CN | 115062976 | A | 9/2022 |
| CN | 116091090 | A | 5/2023 |
| EP | 3798778 | A1 | 3/2021 |
| WO | 2019213177 | A1 | 11/2019 |
| WO | 2021/178385 | A1 | 9/2021 |

OTHER PUBLICATIONS

AcumenResearchAndConsulting, "Vehicle Insurance Market Size is predicted to reach USD 1,223.5 Billion by 2030 at a CAGR of 7.2%, Due to the Increase in Global Automobile Production and Sales," Aug. 16, 2022, 4 pages, Globe Newswire, New York, accessed Aug. 28, 2023, 2. https://www.globenewswire.com/news-release/2022/08/16/2499359/0/en/Vehicle-Insurance-Market-Size-is-predicted-to-reach-USD-1-223-5-Billion-by-2030-at-a-CAGR-of-7-2-Due-to-the-Increase-in-Global-Automobile-Production-and-Sales.html.

DataBridge Market Research, "Used Cars Market Size, Share, Trends, Growth, Demands & Scope by 2030," 18 pages, DataBridge Market Research, accessed Aug. 22, 2023, https://www.databridgemarketresearch.com/reports/global-used-car-market.

Duke, "How machine learning can forecast parts failures," Interviews, Nov. 28, 2018, 5 pages, JustAuto, accessed Aug. 22, 2023, https://www.just-auto.com/interview/how-machine-learning-can-forecast-parts-failures/?cf-view.

Ellencweig, et al., "Used cars, new platforms: Accelerating sales in a digitally disrupted market," Jun. 6, 2019, 15 pages, McKinsey & Company, accessed Aug. 28, 2023, https://www.mckinsey.com/industries/automotive-and-assembly/our-insights/used-cars-new-platforms-accelerating-sales-in-a-digitally-disrupted-market.

ericson.com, "Connected car services platform for all vehicles," Ericson.com, 1994-2023, 9 pages, Telefonaktiebolaget LM Ericson, accessed Aug. 22, 2023, https://www.ericsson.com/en/connected-vehicles/platform.

Geotab, "What is telematics?" Geotab Team, Copyright 2023, 6 pages, Geotab Inc., accessed Aug. 22, 2023, https://www.geotab.com/blog/what-is-telematics.

Gilboa, "From Tesla to Nvidia, digital twins are a complexity solver," 4 pages, Sep. 12, 2022, Lightlytics Ltd., Ramat Gan Israel, accessed Aug. 22, 2023, https://www.lightlytics.com/post/from-tesla-to-nvidia-digital-twins-are-a-complexity-solver.

Gong, et al., "How to Implement Automotive Fault Diagnosis Using Artificial Intelligence Scheme." Micromachines 2022, 13, 1380, Aug. 24, 2022, 28 pages, accessed Aug. 18, 2023, https://www.ncbi.nlm.nih.gov/pmc/articles/PMC9502948.

GrandViewResearch, "Used Car Market Size & Share Report, 2022-2030," Copyright 2023, 9 pages, Grand View Research, Inc., San Francisco, CA, accessed Aug. 22, 2023, https://www.grandviewresearch.com/industry-analysis/used-car-market.

Hagerty, "Factors That Can Affect Used Car Trade-In Value," Jan. 27, 2022, 6 pages, CapitalOne Auto Navigator, accessed Aug. 25, 2023.

Hasan et al., "Blockchain-Based Solution for the Traceability of Spare Parts in Manufacturing," ResearchGate, May 2020, 15 pages, IEEE Access, accessed Aug. 22, 2023, https://www.researchgate.net/publication/341700958_Blockchain-Based_Solution_for_the_Traceability_of_Spare_Parts_in_Manufacturing.

IBM, "Connected car analytics," 10 pages, IBM Corporation, accessed Aug. 28, 2023, https://www.ibm.com/cloud/architecture/architectures/iot_connected_car_analytics/.

IBM, "IBM IoT Connected Vehicle Insights," Copyright 1994, 2023, 7 pages, IBM Corporation, accessed Aug. 22, 2023, https://www.ibm.com/products/iot-for-automotive.

IBM, "Monitor the connected vehicle for predictive analysis," 13 pages, IBM Corporation, accessed Aug. 28, 2023, https://www.ibm.com/cloud/architecture/architectures/automotive-car-sensors.

IBM, "Predictive maintenance with IBM Maximo Application Suite," 3 pages, IBM Corporation, accessed Aug. 28, 2023, https://www.ibm.com/products/maximo/predictive-maintenance.

IBM, "Transformative automotive IT solutions," 7 pages, IBM Corporation, accessed Aug. 28, 2023, https://www.ibm.com/industries/automotive.

IBM: List of IBM Patents or Patent Applications Treated as Related, Filed Sep. 19, 2023, 2 pages. (Appendix P).

Infosys, "Driving Operational Excellence by Maximizing Vehicle Uptime," Insights, Copyright 2023, 1 page, Infosys Limited, accessed Aug. 22, 2023, https://www.infosys.com/industries/waste-management/insights/vehicle-preventive-maintenance.html.

Kagan, "Understanding Aftermarket Parts and Car Insurance," Sep. 14, 2021, 8 pages, Investopedia, accessed on Aug. 25, 2023, https://www.investopedia.com/terms/a/aftermarket-parts.asp.

Kuiper, "Blockchain brings visibility to the finished vehicle supply chain," IBM Blog—Manufacturing, Nov. 5, 2019, 3 pages, IBM Corporation, accessed Aug. 22, 2023, https://www.Ibm.com/blog/blockchain-brings-visibility-to-finished-vehicle-supply-chain/.

MalmanLaw, "Can Aftermarket Car Parts Be Dangerous?" Malman Law Injury Blog, Dec. 8, 2017, 8 pages, Malman Law, Chicago, IL, accessed Aug. 25, 2023, https://www.malmanlaw.com/malman-law-injury-blog/can-aftermarket-car-parts-dangerous/.

Market.us, Automotive Predictive Maintenance Market Value Expected to Reach US$ 100 Billion by 2032, Exclusive Report by Market.us, Apr. 12, 2023, 7 pages, accessed Aug. 18, 2023, https://www.globenewswire.com/en/news-release/2023/04/12/2645682/0/en/Automotive-Predictive-Maintenance-Market-Value-Expected-to-Reach-US-100-Billion-by-2032-Exclusive-Report-by-Market-us.html.

(56) References Cited

OTHER PUBLICATIONS

MordorIntelligence, "US Used Car Market Size & Share Analysis—Growth Trends & Forecasts (2023-2028)," Copyright 2023, 5 pages, Mordor Intelligence, accessed Aug. 22, 2023, https://www.mordorintelligence.com/industry-reports/united-states-used-car-market.
Motion-S, "Protect Your Vehicle Residual Value Using the Power of Data," Copyright 2023, 8 pages, Motion-S.S.A., accessed Aug. 22, 2023, https://motion-s.com/protect-your-vehicle-residual-value-using-the-power-of-data.
OpenLedger, "Blockchain development for the automotive industry," 6 pages, OpenLedger Lab ApS, Aalborg, Denmark, accessed Aug. 22, 2023, https://openledger.info/solutions/blockchain-automotive/.
Piromalis et al., "A. Digital Twins in the Automotive Industry: The Road toward Physical-Digital Convergence," Applied System Innovation. 2022, 12 pages, MDPI, accessed Aug. 22, 2023, https://doi.org/10.3390/asi5040065.
Porsche, "A digital chassis twin for predictive driving functions and component status updates," Porsche Newsroom, Copyright 2023, 5 pages, Porsche, accessed Aug. 22, 2023, https://media.porsche.com/mediakit/innovation-sustainability-performance/en/innovation-sustainability-performance/digital-twin.
RenaultGroup, "Vehicle Digital Twin: when physical and digital models unite," 12 pages, Copyright 2023, Renault Group, accessed on Aug. 22, 2023, https://www.renaultgroup.com/en/news-on-air/news/vehicle-digital-twin-when-physical-and-digital-models-unite/.
Sowers, "The Car Maintenance Schedule You Should Follow," Copyright 2023, 10 pages, accessed Aug. 25, 2023, https://www.cargurus.com/Cars/articles/the-car-maintenance-schedule-you-should-follow.

* cited by examiner

COMPUTING ENVIRONMENT 100

VEHICLE MAINTENANCE DATA STRUCTURE 400

| USER ID (402) | VEHICLE ID (404) | DRIVING BEHAVIOR (406) | SUBSYSTEM CONDITION [SUBSYSTEM ID] [CONDITION] (408) | SUBSYSTEM ISSUE (410) | VEHICLE REPAIR SHOP ID (412) | AVAILABLE TIMES DATE: TIMES (414) | SCHEDULED TIME DATE: TIME (416) | CONFIRMATION (418) |
|---|---|---|---|---|---|---|---|---|
| User001 | Vehicle001 | AGGRESSIVE | ENGINE: TEMPERATURE SENSOR (>270 °F) | YES | VRS0001 | 05/15/2023: 10AM~5PM | 05/15/2023: 1PM | CONFIRMED |
| User002 | Vehicle002 | DEFENSIVE | ENGINE: TEMPERATURE SENSOR (>285 °F) | YES | VRS0002 | 05/14/2023: 10AM~5PM | 05/14/2023: 1PM | CONFIRMED |
| User003 | Vehicle003 | AGGRESSIVE | POWERTRAIN: OIL CHANGE MILEAGE (>5000 MILES) | YES | VRS0002 | 05/16/2023: 10AM~5PM | 05/16/2023: 1PM | PENDING CONFIRMATION |
| User004 | Vehicle004 | DEFENSIVE | POWERTRAIN: OIL CHANGE MILEAGE (>7500 MILES) | YES | VRS0001 | 05/16/2023: 10AM~5PM | 05/16/2023: 1PM | CONFIRMED |

FIG. 4

MAINTENANCE MANAGEMENT FOR VEHICLES HAVING NETWORK IOT SENSOR DATA ANALYSIS ENABLED

BACKGROUND

The disclosure relates generally to vehicles and more specifically to vehicle maintenance.

Vehicle maintenance is a part of vehicle ownership. Performing maintenance on a vehicle helps to make sure that the vehicle provides safe and reliable transportation. For example, performing maintenance at regular intervals keeps the vehicle in proper working order and could prevent expensive repairs in the future caused by breakdown. Also, failing to follow manufacturer vehicle maintenance guidelines could void the vehicle's warranty.

SUMMARY

According to one illustrative embodiment, a computer-implemented method for dynamic vehicle maintenance management is provided. A computer monitors performance of each subsystem of a plurality of subsystems corresponding to a vehicle and driving behavior of a user of the vehicle by performing an analysis of data collected from an Internet of Things (IoT) sensor system onboard the vehicle to detect any subsystem issues in the vehicle using a set of machine learning models. The computer detects an issue in a subsystem of the vehicle based on the analysis of the data collected from the IoT sensor system onboard the vehicle. The computer schedules maintenance corresponding to the issue detected in the subsystem of the vehicle at a date, time, and location based on availability of the user of the vehicle and a selected vehicle repair shop. The computer sends a notification regarding the maintenance corresponding to the issue detected in the subsystem of the vehicle to the user of the vehicle via a network, the notification including at least the date, time, and location of the maintenance corresponding to the issue detected in the subsystem of the vehicle. According to other illustrative embodiments, a computer system and computer program product for dynamic vehicle maintenance management are provided.

BRIEF DESCRIPTION OF THE DRAWINGS

FIG. 4 is a diagram illustrating an example of a vehicle maintenance data structure in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
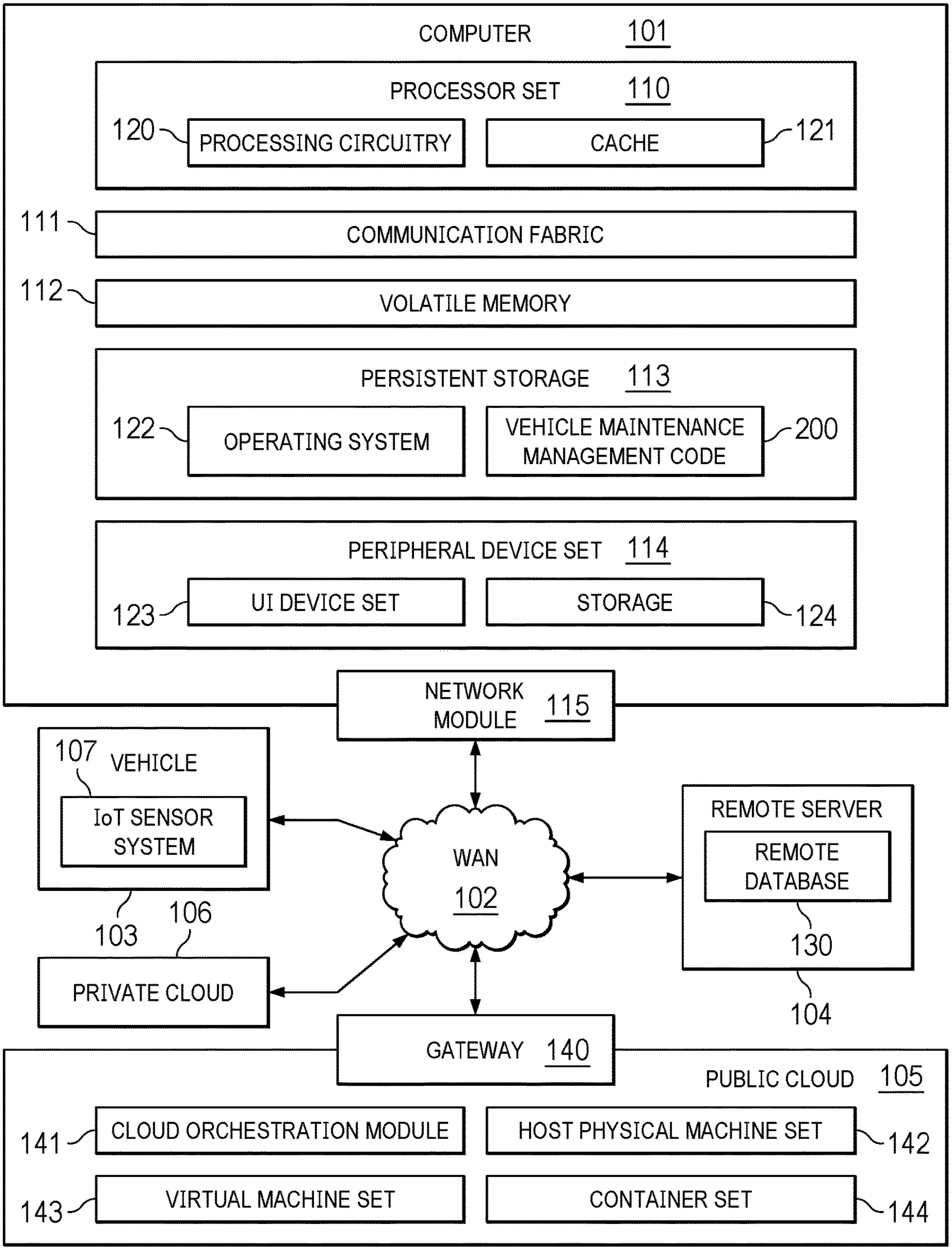
FIG. 1 is a pictorial representation of a computing environment in which illustrative embodiments may be implemented.
Figure 2:
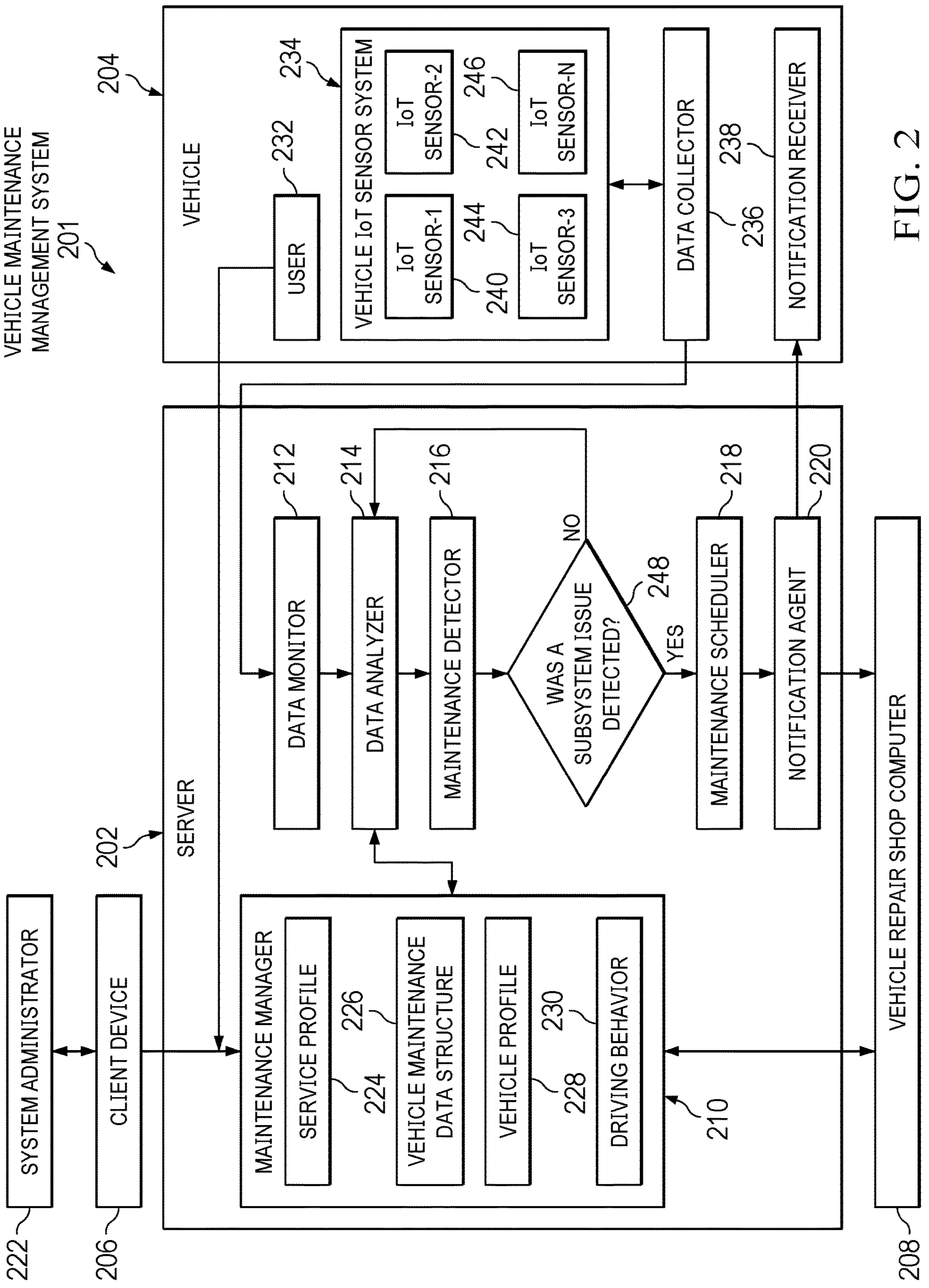
FIG. 2 is a diagram illustrating an example of a vehicle maintenance management system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as vehicle maintenance management code 200. For example, vehicle maintenance management code 200 collects and analyzes data received from an Internet of Things (IoT) sensor system located onboard a vehicle regarding performance of each subsystem of a plurality of subsystems comprising the vehicle and driving behavior of a user of the vehicle. As a result, vehicle maintenance management code 200 is capable of providing an IoT-based solution for automated vehicle maintenance scheduling that incorporates the use of the onboard IoT sensor system to obtain data on vehicle subsystem performance (e.g., health) and driving behavior (e.g., cautious, defensive, aggressive, reckless, or the like) of the user and apply a set of machine learning models to the data to detect any potential subsystem issues to optimize maintenance scheduling for the vehicle. Thus, by vehicle maintenance management code 200 utilizing the onboard IoT sensor system and machine learning models to proactively schedule vehicle maintenance, vehicle maintenance management code 200 is able to increase vehicle performance and decrease likelihood of accidents caused by subsystem failure.

In addition to vehicle maintenance management code 200, computing environment 100 includes, for example, computer 101, wide area network (WAN) 102, vehicle 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and vehicle maintenance management code 200, as identified above), peripheral device set 114 (including user interface (UI) device set 123 and storage 124), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in vehicle maintenance management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

Vehicle 103 can represent any type of vehicle (e.g., car, truck, van, bus, semi, motorcycle, or the like) that is used and controlled by a user (e.g., a driver that registered vehicle 103 for the vehicle maintenance management service provided by computer 101). Also, it should be noted that vehicle 103 can represent a multitude of vehicles registered for the vehicle maintenance management service provided by computer 101. Vehicle 103 includes a network module, which is similar to network module 115, that allows vehicle 103 to communicate with computer 101 via WAN 102. Vehicle 103 typically receives helpful and useful data from the operations of computer 101. For example, in a hypothetical case where computer 101 is designed to provide a vehicle maintenance notification to the user, this notification would typically be communicated from network module 115 of computer 101 via WAN 102 to vehicle 103. In this way, vehicle 103 can display, or otherwise present, the notification to the user of vehicle 103.

Vehicle 103 includes IoT sensor system 107. IoT sensor system 107 is comprised of different sets of sensors (e.g., heat sensors, pressure sensors, speed sensors, acceleration sensors, voltage sensors, and the like) corresponding to different subsystems (e.g., engine, ignition, transmission, brakes, suspension, tires, and the like) of vehicle 103. Vehicle maintenance management code 200 collects data from IoT sensor system 107 and analyzes the data to detect whether any of the plurality of subsystems comprising vehicle 103 has an issue and to detect the driving behavior of the user of vehicle 103.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a vehicle maintenance recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Vehicle maintenance is a basic aspect of owning a vehicle, as proper maintenance increases vehicle safety and longevity. However, many vehicle owners struggle with keeping up with vehicle maintenance, which when missed can lead to costly repairs or accidents.

For example, a vehicle owner may not realize that the brake pads need replacing until a grinding noise is heard, which can lead to costly repairs and potentially dangerous driving conditions. In addition, the vehicle owner may not realize that the wheels need alignment until a vibration is felt in the steering wheel, which can lead to increased wear on the tires and reduced fuel efficiency.

Further, a typical operating temperature for most engines is between 195 and 220 degrees Fahrenheit (90-105 degrees Celsius). This temperature range allows an engine to operate efficiently, while also minimizing wear and tear on engine components, such as, for example, pistons, bearings, seals, and the like. However, if this engine temperature range is exceeded, it can indicate an issue, such as, for example, a malfunctioning cooling system or a coolant leak, which can cause extensive engine damage. In this case where the engine temperature range is exceeded, it is important to take immediate action to address the issue to prevent engine damage and potential safety hazards (e.g., engine fire).

Furthermore, manufacturers generally recommend oil changes in a vehicle at defined mileage intervals, such as, for example, every 5,000 miles, depending on the make and model of the vehicle. However, aggressive driving, such as frequent high-speed acceleration and hard braking, can put more stress on the engine and cause the oil to break down faster. This aggressive driving can result in the need for more frequent oil changes, such as, for example, every 3,000 miles instead of the manufacturer's recommended mileage of every 5,000 miles. On the other hand, defensive driving, which involves smoother acceleration and softer braking, can help extend the life of the oil and allow for longer intervals between oil changes, such as, for example, every 7,000 miles.

Currently, vehicle maintenance relies on the owner's knowledge or experience, which can be limited. To address the limited knowledge and experience of vehicle owners, illustrative embodiments provide an automated vehicle maintenance service using data received from a plurality of IoT sensors corresponding to various subsystems of a vehicle and analyzing the data using, for example, a set of machine learning models, to detect potential issues with one or more of the vehicle's subsystems. The plurality of IoT sensors can include, for example, an oxygen sensor, mass airflow sensor, throttle position sensor, transmission fluid temperature sensor, tire pressure monitoring system sensors, anti-lock braking system wheel speed sensor, coolant temperature sensor, GPS sensor, accelerometer sensor, gyroscopic sensor, and the like. Illustrative embodiments can utilize the data from the GPS sensor, accelerometer sensor, and gyroscopic sensor to monitor, for example, the vehicle's location, speed, acceleration, and orientation.

By using IoT sensors to monitor vehicle user driving behavior, such as speed, acceleration, and braking, and analyzing this data in conjunction with information on the specific make and model of the vehicle, it is possible to create a customized maintenance schedule that takes into account individual driving patterns of vehicle users. This can lead to more efficient and effective vehicle maintenance with regard to oil changes and other maintenance tasks based on actual driving conditions and behavior rather than relying on a generic maintenance schedule.

Illustrative embodiments receive a registration of a vehicle for the vehicle maintenance management service provided by illustrative embodiments from a user (e.g., owner) of the vehicle. In response to receiving the registration, illustrative embodiments define a record corresponding to the vehicle in a vehicle maintenance data structure of the vehicle maintenance management service. The vehicle maintenance data structure includes, for example, vehicle user identifier, vehicle identifier, vehicle user driving behavior, vehicle subsystem condition to include subsystem identifier and condition of that subsystem, indication of an issue with the subsystem, vehicle repair shop identifier, available times for a maintenance appointment, scheduled maintenance appointment time, maintenance appointment confirmation, and the like. Moreover, illustrative embodiments allow the user to customize the automated vehicle maintenance service according to user preference for that vehicle (e.g., user-preferred oil change mileage interval, air filter change interval, sparkplug change interval, and the like).

Illustrative embodiments collect the data regarding performance of each subsystem of the plurality of subsystems corresponding to the vehicle and driving behavior of the user of the vehicle from the IoT sensor system onboard the vehicle via a network. Each subsystem of the plurality of subsystems includes a set of IoT sensors. Illustrative embodiments monitor the performance of each subsystem and the driving behavior of the user of the vehicle based on the collected data from the IoT sensor system by performing an analysis of the collected data using a set of machine learning models. The set of machine leaning models are trained to identify different driving behaviors, different subsystem maintenance patterns, different subsystem issues, and the like based on historic data and user feedback.

Based on the analysis of the collected data, illustrative embodiments detect any issues with one or more subsystem of the vehicle. For example, if the collected data from the IoT sensor system indicate that the engine temperature is consistently higher than normal, then illustrative embodiments may determine that an issue exists with the coolant subsystem and that an immediate inspection and coolant flush are needed. In response to detecting an issue with a subsystem of the vehicle, illustrative embodiments automatically schedule an appointment for a type of maintenance service (e.g., coolant flush, oil change, tire rotation, brake lining replacement, or the like) at a specific date, time, and location according to the detected issue with the subsystem and detected availability of the user of the vehicle and detected availability of an appropriate vehicle repair shop. Illustrative embodiments may detect the availability of the user and the availability of the vehicle repair shop based on, for example, analyzing online electronic calendars corresponding to the user and the vehicle repair shop.

However, it should be noted that illustrative embodiments can determine that the maintenance service should be performed on the vehicle prior to arrival at a destination. Illustrative embodiments can determine the destination based on, for example, an input by the user of the vehicle, sensor data received from a navigation subsystem of the vehicle, or the like. Illustrative embodiments will then automatically schedule the appointment for the maintenance service accordingly (i.e., as soon as possible at a nearest vehicle repair shop that can perform that type of maintenance service).

Afterward, illustrative embodiments send a notification to the user of the vehicle regarding the scheduled appointment via the network. For example, illustrative embodiments can send the notification to an audio system of the vehicle, a navigation system of the vehicle, a mobile phone corresponding to the user, or the like. The notification includes details of the appointment, along with the date, time, and location of the appointment. Subsequently, illustrative embodiments receive confirmation of the appointment from the user of the vehicle via the network. Moreover, illustrative embodiments collect user feedback regarding the vehicle maintenance appointment and utilize the user feedback as further training data for the machine learning models to increase the predictive accuracy of the machine learning models.

Thus, illustrative embodiments provide increased vehicle safety by proactively detecting and addressing maintenance issues to prevent vehicle breakdown and accidents caused by failure of one or more vehicle subsystems. Illustrative embodiments also provide improved vehicle performance by automatically scheduling maintenance servicing to keep the vehicle running efficiently, which can lead to, for example, improved fuel efficiency. In addition, illustrative embodiments provide user convenience by automatically scheduling maintenance appointments saving users time and effort associated with unexpected or emergency repairs and vehicle downtime. Further, illustrative embodiments improve the predictive accuracy of the machine learning models over time by collecting user feedback regarding the maintenance appointments and utilizing the user feedback as additional training data for the machine learning models.

Thus, illustrative embodiments provide one or more technical solutions that overcome a technical problem with an inability of current solutions to dynamically customize vehicle maintenance based on analysis of data corresponding to performance of vehicle subsystems received from IoT sensor systems onboard the vehicles. As a result, these one or more technical solutions provide a technical effect and practical application in the field of vehicle performance and safety.

With reference now to FIG. 2, a diagram illustrating an example of a vehicle maintenance management system is depicted in accordance with an illustrative embodiment. Vehicle maintenance management system 201 may be implemented in a computing environment, such as computing environment 100 in FIG. 1. Vehicle maintenance management system 201 is a system of hardware and software components for dynamic maintenance management of vehicles having network IoT sensor data analysis enabled.

In this example, vehicle maintenance management system 201 includes server 202, vehicle 204, client device 206, and vehicle repair shop computer 208. However, it should be noted that vehicle maintenance management system 201 is intended to be an example only and not as a limitation on illustrative embodiments. For example, vehicle maintenance management system 201 can include any number of servers, vehicles, client devices, vehicle repair shop computers, and other devices and components not shown.

Server 202 may be, for example, computer 101 in FIG. 1. In addition, server 202 may be located in a cloud environment, such as, for example, public cloud 105 in FIG. 1. Further, even though not shown in this example, server 202 is connected to vehicle 204, client device 206, and vehicle repair shop computer 208 via a network, such as, for example, WAN 102 in FIG. 1.

In this example, server 202 includes maintenance manager 210, data monitor 212, data analyzer 214, maintenance detector 216, maintenance scheduler 218, and notification agent 220. Also, maintenance manager 210, data monitor 212, data analyzer 214, maintenance detector 216, maintenance scheduler 218, and notification agent 220 can be implemented by, for example, vehicle maintenance management code 200 in FIG. 1.

System administrator 222 configures maintenance manager 210 utilizing client device 206. Maintenance manager 210 includes service profile 224, vehicle maintenance data structure 226, vehicle profile 228, and driving behavior 230. Service profile 224 includes manufacturer, dealer, or user settings for scheduled maintenance of a plurality of different vehicles, such as vehicle 204. Vehicle maintenance data structure 226 represents a plurality of records for a plurality of different vehicle users and their corresponding vehicles (e.g., see vehicle maintenance data structure 400 in FIG. 4 below). Vehicle profile 228 includes specifications (e.g., year, make, model, chassis, engine, powertrain, and the like) for a plurality of different vehicles. Driving behavior 230 identifies a plurality of different types of driving patterns of vehicle users, along with characteristics or attributes of each particular driving pattern.

User 232 represents a driver of vehicle 204. It should be noted that server 202 enables or allows user 232 to customize maintenance settings for vehicle 204 in service profile 224. Vehicle 204 includes vehicle IoT sensor system 234, data collector 236, and notification receiver 238.

Vehicle IoT sensor system 234 includes a plurality of IoT sensors, such as IoT sensor-1 240, IoT sensor-2 242, IoT sensor-3 244, and IoT sensor-N 246 (e.g., see vehicle IoT sensor system 300 in FIG. 3 below). Each of IoT sensor-1 240, IoT sensor-2 242, IoT sensor-3 244, and IoT sensor-N 246 corresponds to a different subsystem of vehicle 204. Thus, each of IoT sensor-1 240, IoT sensor-2 242, IoT sensor-3 244, and IoT sensor-N 246 generates data regarding the performance, state, or health of its corresponding subsystem.

Data collector 236 receives the data generated by each of IoT sensor-1 240, IoT sensor-2 242, IoT sensor-3 244, and IoT sensor-N 246. Data collector 236 sends the data regarding the performance of the different subsystems of vehicle 204 to data monitor 212 on one of a predefined time interval basis, a continuous basis, or on demand from data monitor 212 or user 232.

Data monitor 212 inputs the obtained data regarding the performance of the different subsystems of vehicle 204 to data analyzer 214. Data analyzer 214 and maintenance detector 216 include a set of machine learning models to analyze the obtained data regarding the performance of the different subsystems of vehicle 204 and detect whether any of the subsystems of vehicle 204 has an issue and the driving behavior of user 232. At 248, maintenance detector 216 determines whether an issue with a subsystem of vehicle 204 was detected. If no issue with a subsystem of vehicle 204 was detected, then data analyzer 214 and maintenance detector 216 continue to analyze data obtained by data monitor 212 for the detection of subsystem issues on vehicle 204. If an issue with a subsystem of vehicle 204 was detected, then maintenance scheduler 218 automatically schedules a maintenance appointment with vehicle repair shop computer 208 to repair the issue with the subsystem. In addition, notification agent 220 sends a notification regarding details of the scheduled maintenance appointment to notification receiver 238 onboard vehicle 204 for user 232 to review and confirm.

Figure 3:
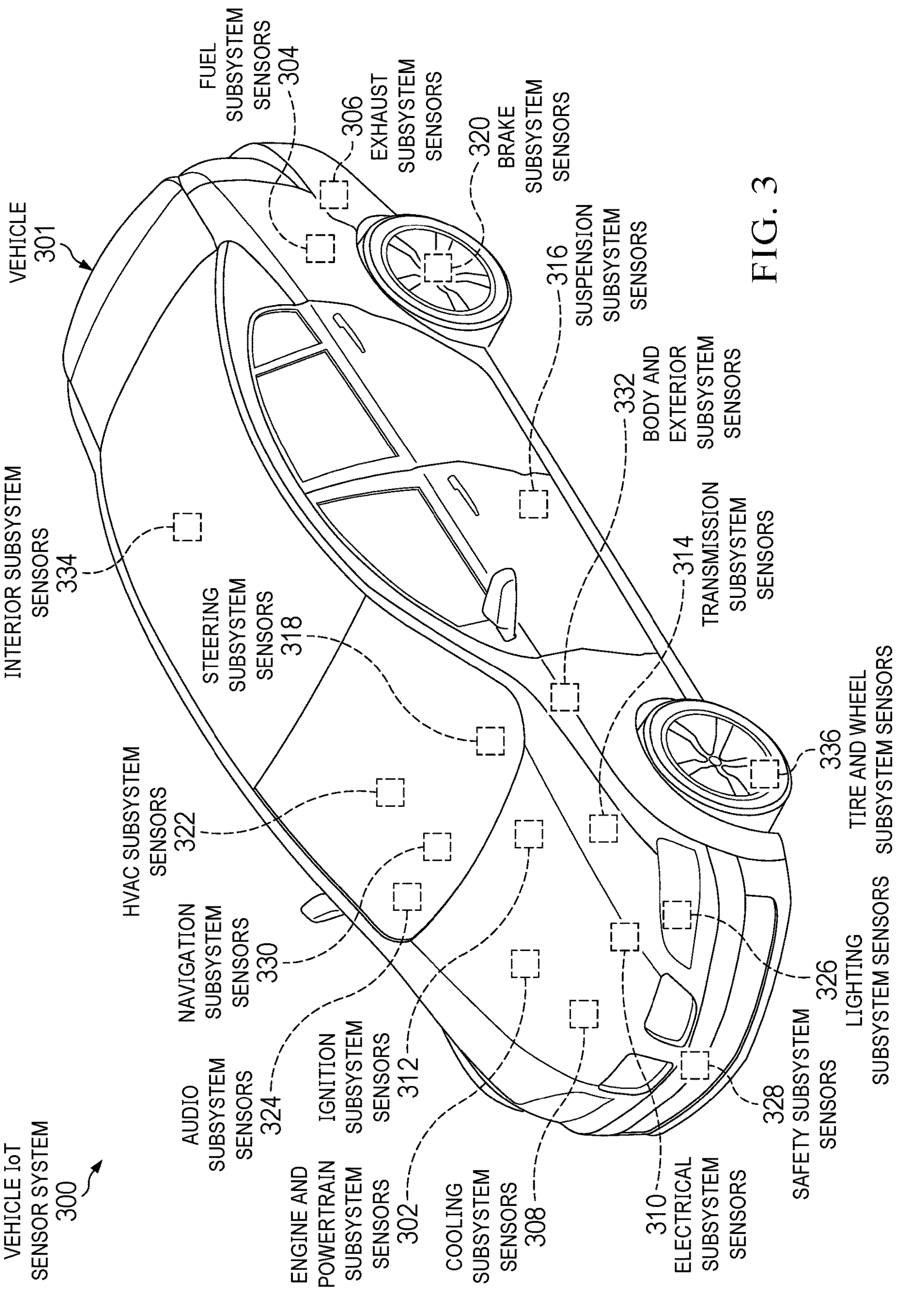
FIG. 3 is a diagram illustrating an example of a vehicle Internet of Things (IoT) sensor system in accordance with an illustrative embodiment.

With reference now to FIG. 3, a diagram illustrating an example of an IoT sensor system is depicted in accordance with an illustrative embodiment. Vehicle IoT sensor system 300 is implemented in vehicle 301. Vehicle 301 may be, for example, vehicle 103 in FIG. 1 or vehicle 204 in FIG. 2. Vehicle IoT sensor system 300 may be, for example, IoT sensor system 107 in FIG. 1 or vehicle IoT sensor system 234 in FIG. 2.

Vehicle IoT sensor system 300 includes a plurality of different sets of IoT sensors corresponding to different subsystems of vehicle 301. For example, vehicle IoT sensor system 300 includes engine and powertrain subsystem sensors 302, fuel subsystem sensors 304, exhaust subsystem sensors 306, cooling subsystem sensors 308, electrical subsystem sensors 310, ignition subsystem sensors 312, transmission subsystem sensors 314, suspension subsystem sensors 316, steering subsystem sensors 318, brake subsystem sensors 320, Heating, Ventilation, and Air Conditioning (HVAC) subsystem sensors 322, audio subsystem sensors 324, lighting subsystem sensors 326, safety subsystem sensors 328, navigation subsystem sensors 330, body and exterior subsystem sensors 332, interior subsystem sensors 334, and tire and wheel subsystem sensors 336.

Engine and powertrain subsystem sensors 302 include, for example, temperature sensors, pressure sensors, vibration sensors, fluid level sensors, and the like. Fuel subsystem sensors 304 include, for example, fuel level sensors, fuel flow sensors, fuel pressure sensors, and the like. Exhaust subsystem sensors 306 include, for example, emission sensors, temperature sensors, and the like. Cooling subsystem sensors 308 include, for example, temperature sensors, pressure sensors, coolant level sensors, and the like. Electrical subsystem sensors 310 include, for example, voltage sensors, current sensors, battery charge sensors, and the like. Ignition subsystem sensors 312 include, for example, spark plug sensors, ignition timing sensors, and the like. Transmission subsystem sensors 314 include, for example, transmission fluid temperature sensors, gear position sensors, transmission speed sensors, and the like. Suspension subsystem sensors 316 include, for example, shock absorber sensors, ride height sensors, wheel alignment sensors, and the like. Steering subsystem sensors 318 include, for example, steering angle sensors, steering wheel position sensors, and the like. Brake subsystem sensors 320 include, for example, brake pad wear sensors, brake fluid level sensors, brake temperature sensors, and the like. HVAC subsystem sensors 322 include, for example, temperature sensors, humidity sensors, air quality sensors, and the like. Audio subsystem sensors 324 include, for example, microphone sensors, speaker sensors, and the like. Lighting subsystem sensors 326 include, for example, light intensity sensors, ambient light sensors, and the like. Safety subsystem sensors 328 include, for example, accelerometer sensors, pressure sensors, collision sensors, lane departure sensors, motion sensors, and the like. Navigation subsystem sensors 330 include, for example, GPS sensors, inertial sensors, and the like. Body and exterior subsystem sensors 332 include, for example, proximity sensors, imaging sensors, ultrasonic sensors, and the like. Interior subsystem sensors 334 include, for example, occupant sensors, seatbelt sensors, temperature sensors, motion sensors, sound sensors, imaging sensors, and the like. Tire and wheel subsystem sensors 336 include, for example, tire pressure sensors, tire temperature sensors, wheel speed sensors, and the like.

However, it should be noted that vehicle IoT sensor system 300 is intended as an example only and not as a limitation on illustrative embodiments. In other words, vehicle IoT sensor system 300 can includes any number and type of subsystem sensors. For example, two or more subsystem sensors can be combined, one subsystem sensor can be divided into two or more subsystem sensors, one or more subsystem sensors can be removed, or one or more subsystem sensors not shown can be added.

With reference now to FIG. 4, a diagram illustrating an example of a vehicle maintenance data structure is depicted in accordance with an illustrative embodiment. Vehicle maintenance data structure 400 can be implemented in a maintenance manager, such as, for example, maintenance manager 210 in FIG. 2.

In this example, vehicle maintenance data structure 400 includes user identifier (ID) 402, vehicle ID 404, driving behavior 406, subsystem condition 408, subsystem issue 410, vehicle repair shop ID 412, available times 414, scheduled time 416, and confirmation 418. However, it should be noted that vehicle maintenance data structure 400 is intended as an example only and not as a limitation on illustrative embodiments. For example, vehicle maintenance data structure 400 can include more information than shown.

User ID 402 uniquely identifies the user of the vehicle identified by corresponding vehicle ID 404. Driving behavior 406 indicates the driving pattern (e.g., aggressive, defensive, or the like) of the corresponding user identified by user ID 402. Subsystem condition 408 identifies a particular subsystem of the corresponding vehicle identified by vehicle ID 404 and a current state of that particular subsystem. Subsystem issue 410 indicates (e.g., YES or NO) whether the corresponding subsystem identified in subsystem condition 408 has a problem or is malfunctioning. Vehicle repair shop ID 412 uniquely identifies a particular repair shop where the corresponding vehicle identified by vehicle ID 404 is to have a scheduled maintenance appointment. Available times 414 indicate the date and times when the corresponding vehicle repair shop identified by vehicle repair shop ID 412 can perform the maintenance. Scheduled time 416 indicates the scheduled date and time for the maintenance. Confirmation 418 indicates whether the corresponding user identified by user ID 402 confirmed scheduled time 416 or not.

Figure 5A:
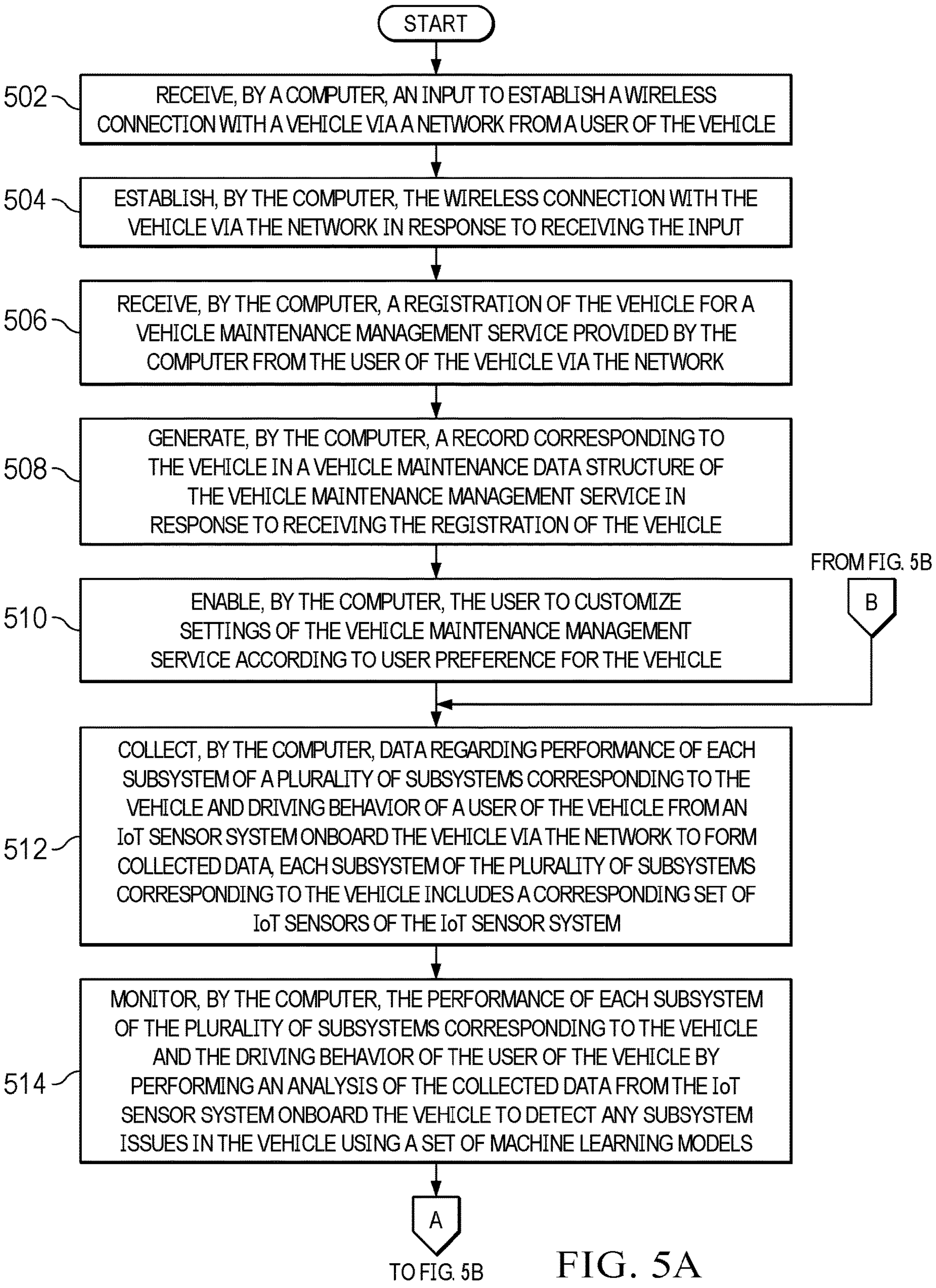
FIGS. 5A-5B are a flowchart illustrating a process for automatic maintenance management of vehicles having network IoT sensor data analysis enabled in accordance with an illustrative embodiment.
Figure 5B:
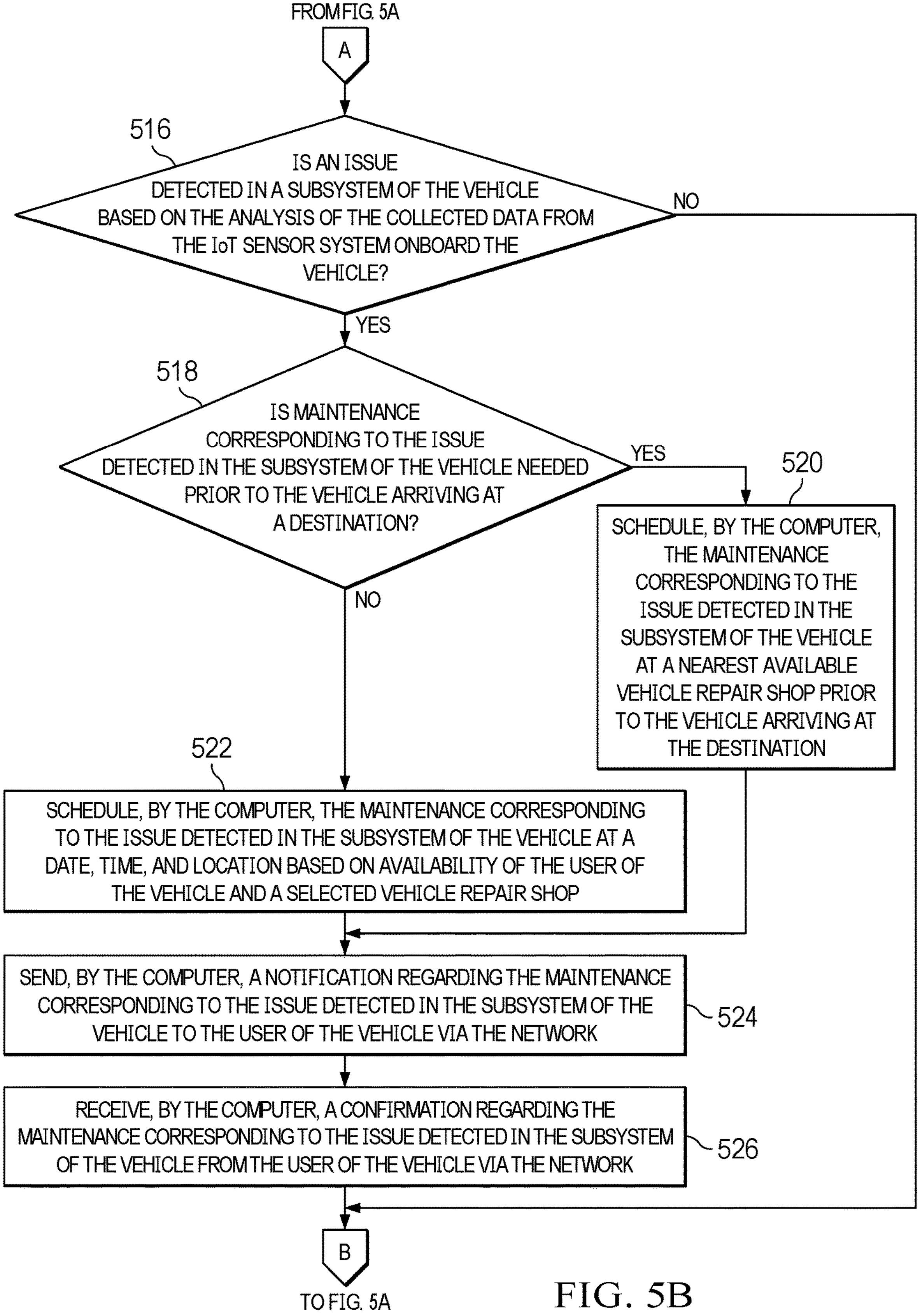

With reference now to FIGS. 5A-5B, a flowchart illustrating a process for automatic maintenance management of vehicles having network IoT sensor data analysis enabled is shown in accordance with an illustrative embodiment. The process shown in FIGS. 5A-5B may be implemented in a computer, such as, for example, computer 101 in FIG. 1 or server 202 in FIG. 2. For example, the process shown in FIGS. 5A-5B may be implemented in vehicle maintenance management code 200 in FIG. 1.

The process begins when the computer receives an input to establish a wireless connection with a vehicle via a network from a user of the vehicle (step 502). The computer establishes the wireless connection with the vehicle via the network in response to receiving the input (step 504).

The computer receives a registration of the vehicle for a vehicle maintenance management service provided by the computer from the user of the vehicle via the network (step 506). The computer generates a record corresponding to the vehicle in a vehicle maintenance data structure of the vehicle maintenance management service in response to receiving the registration of the vehicle (step 508). In addition, the computer enables the user to customize settings of the vehicle maintenance management service according to user preference for the vehicle (step 510).

The computer collects data regarding performance of each subsystem of a plurality of subsystems corresponding to the vehicle and driving behavior of a user of the vehicle from an IoT sensor system onboard the vehicle via the network to form collected data (step 512). Each subsystem of the plurality of subsystems corresponding to the vehicle includes a corresponding set of IoT sensors of the IoT sensor system. The computer monitors the performance of each subsystem of the plurality of subsystems corresponding to the vehicle and the driving behavior of the user of the vehicle by performing an analysis of the collected data from the IoT sensor system onboard the vehicle to detect any subsystem issues in the vehicle using a set of machine learning models (step 514).

The computer makes a determination as to whether an issue is detected in a subsystem of the vehicle based on the analysis of the collected data from the IoT sensor system (step 516). If the computer determines that no issue is detected in a subsystem of the vehicle based on the analysis of the collected data from the IoT sensor system onboard the vehicle, no output of step 516, then the process returns to step 512 where the computer continues to collect data regarding the performance of each subsystem. If the computer determines that an issue is detected in a subsystem of the vehicle based on the analysis of the collected data from the IoT sensor system onboard the vehicle, yes output of step 516, then the computer makes a determination as to whether maintenance corresponding to the issue detected in the subsystem of the vehicle is needed prior to the vehicle arriving at a destination (step 518).

If the computer determines that maintenance corresponding to the issue detected in the subsystem of the vehicle is needed prior to the vehicle arriving at the destination, yes output of step 518, then the computer schedules the maintenance corresponding to the issue detected in the subsystem of the vehicle at a nearest available vehicle repair shop prior to the vehicle arriving at the destination (step 520). Thereafter, the process proceeds to step 524. If the computer determines that the maintenance corresponding to the issue detected in the subsystem of the vehicle is not needed prior to the vehicle arriving at the destination, no output of step 518, then the computer schedules the maintenance corresponding to the issue detected in the subsystem of the vehicle at a date, time, and location based on availability of the user of the vehicle and a selected vehicle repair shop (step 522). The computer may select the vehicle repair shop based on, for example, user preference. Alternatively, the computer may select the vehicle repair shop based on, for example, at least one of location, availability, specialty, and the like.

Afterward, the computer sends a notification regarding the maintenance corresponding to the issue detected in the subsystem of the vehicle to the user of the vehicle via the network (step 524). The notification includes at least the date, time, and location of the maintenance corresponding to the issue detected in the subsystem of the vehicle. Subsequently, the computer receives a confirmation regarding the maintenance corresponding to the issue detected in the subsystem of the vehicle from the user of the vehicle via the network (step 526). Thereafter, the process returns to step 512 where the computer continues to collect data regarding the performance of each subsystem.

Thus, illustrative embodiments of the present disclosure provide a computer-implemented method, computer system, and computer program product for dynamic maintenance management of vehicles having network IoT sensor data analysis enabled. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamic vehicle maintenance management, the computer-implemented method comprising:

training, by a computer, a set of machine learning models to identify different driving behaviors, different subsystem maintenance patterns, and different subsystem issues based on historic data;

collecting, by the computer, data on a continuous basis from an Internet of Things (IoT) sensor system that includes engine and powertrain subsystem sensors, fuel subsystem sensors, exhaust subsystem sensors, cooling subsystem sensors, electrical subsystem sensors, ignition subsystem sensors, transmission subsystem sensors, suspension subsystem sensors, steering subsystem sensors, brake subsystem sensors, Heating, Ventilation, and Air Conditioning subsystem sensors, audio subsystem sensors, lighting subsystem sensors, safety subsystem sensors, navigation subsystem sensors, body and exterior subsystem sensors, interior subsystem sensors, and tire and wheel subsystem sensors onboard a vehicle;

analyzing, by the computer, utilizing the set of machine learning models, the data collected on the continuous basis from the IoT sensor system onboard the vehicle to detect driving behavior of a user of the vehicle as one of cautious, defensive, aggressive, and reckless based on speed, acceleration, and braking of the vehicle by the user and to detect an issue with a subsystem of the vehicle;

determining, by the computer, a customized maintenance schedule for the vehicle that takes into account the driving behavior of the user of the vehicle and the issue with the subsystem of the vehicle;

predicting, by the computer, utilizing the set of machine learning models, a potential subsystem failure based on the driving behavior of the user of the vehicle and the issue with the subsystem of the vehicle;

scheduling, by the computer, a maintenance appointment proactively with a vehicle repair shop computer to repair the issue with the subsystem of the vehicle to increase performance of the vehicle, wherein the maintenance appointment corresponds to the issue with the subsystem of the vehicle at a date, time, and location based on availability of the user of the vehicle and a selected vehicle repair shop as detected in corresponding online electronic calendars of the user and selected vehicle repair shop;

sending, by the computer, a notification regarding the maintenance appointment corresponding to the issue with the subsystem of the vehicle to the user of the vehicle via a network, the notification including at least the date, the time, and the location of the maintenance appointment corresponding to the issue detected in the subsystem of the vehicle;

collecting, by the computer, user feedback from the user of the vehicle regarding the maintenance appointment; and retraining, by the computer, the set of machine learning models utilizing the user feedback collected from the user of the vehicle to increase predictive accuracy of the set of machine learning models and provide proactive detection by addressing maintenance issues to prevent vehicle breakdown and accidents caused by failure of one or more vehicle subsystems.

2. The computer-implemented method of claim 1, further comprising:

determining, by the computer, whether the maintenance appointment corresponding to the issue detected in the subsystem of the vehicle is needed prior to the vehicle arriving at a destination; and scheduling, by the computer, the maintenance appointment corresponding to the issue detected in the subsystem of the vehicle at a nearest available vehicle repair shop prior to the vehicle arriving at the destination in response to the computer determining that the maintenance appointment corresponding to the issue detected in the subsystem of the vehicle is needed prior to the vehicle arriving at the destination.

3. The computer-implemented method of claim 1, further comprising:

receiving, by the computer, a confirmation regarding the maintenance appointment corresponding to the issue detected in the subsystem of the vehicle from the user of the vehicle via the network.

4. The computer-implemented method of claim 1, further comprising:

collecting, by the computer, the data regarding performance of each subsystem from a plurality of subsystems from the IoT sensor system onboard the vehicle via the network.

5. The computer-implemented method of claim 4, wherein each subsystem of the plurality of subsystems corresponding to the vehicle includes a corresponding set of IoT sensors of the IoT sensor system.

6. The computer-implemented method of claim 1, further comprising:

receiving, by the computer, an input to establish a wireless connection with the vehicle via the network from the user of the vehicle;

establishing, by the computer, the wireless connection with the vehicle via the network in response to receiving the input;

receiving, by the computer, a registration of the vehicle for a vehicle maintenance management service provided by the computer from the user of the vehicle via the network; and generating, by the computer, a record corresponding to the vehicle in a vehicle maintenance data structure of the vehicle maintenance management service in response to receiving the registration of the vehicle, wherein the record corresponding to the vehicle includes identifier of the user of the vehicle, identifier of the vehicle, the driving behavior of the user of the vehicle, vehicle subsystem condition to include identifier of the subsystem and condition of the subsystem, the issue with the subsystem, identifier of the selected vehicle repair shop, available times for the maintenance appointment, scheduled time for the maintenance appointment, and confirmation of the maintenance appointment.

7. The computer-implemented method of claim 6, further comprising:

enabling, by the computer, the user to customize settings of the vehicle maintenance management service according to user preference for the vehicle.

8. A computer system for dynamic vehicle maintenance management, the computer system comprising:

a communication fabric;

a storage device connected to the communication fabric, wherein the storage device stores program instructions; and a processor connected to the communication fabric, wherein the processor executes the program instructions to:

train a set of machine learning models to identify different driving behaviors, different subsystem maintenance patterns, and different subsystem issues based on historic data;

collect data on a continuous basis from an Internet of Things (IoT) sensor system that includes engine and powertrain subsystem sensors, fuel subsystem sensors, exhaust subsystem sensors, cooling subsystem sensors, electrical subsystem sensors, ignition subsystem sensors, transmission subsystem sensors, suspension subsystem sensors, steering subsystem sensors, brake subsystem sensors, Heating, Ventilation, and Air Conditioning subsystem sensors, audio subsystem sensors, lighting subsystem sensors, safety subsystem sensors, navigation subsystem sensors, body and exterior subsystem sensors, interior subsystem sensors, and tire and wheel subsystem sensors onboard a vehicle;

analyze, utilizing the set of machine learning models, the data collected on the continuous basis from the IoT sensor system onboard the vehicle to detect driving behavior of a user of the vehicle as one of cautious, defensive, aggressive, and reckless based on speed, acceleration, and braking of the vehicle by the user and to detect an issue with a subsystem of the vehicle;

determine a customized maintenance schedule for the vehicle that takes into account the driving behavior of the user of the vehicle and the issue with the subsystem of the vehicle;

predict, utilizing the set of machine learning models, a potential subsystem failure based on the driving behavior of the user of the vehicle and the issue with the subsystem of the vehicle;

schedule a maintenance appointment proactively with a vehicle repair shop computer to repair the issue with the subsystem of the vehicle to increase performance of the vehicle, wherein the maintenance appointment corresponds to the issue with the subsystem of the vehicle at a date, time, and location based on availability of the user of the vehicle and a selected vehicle repair shop as detected in corresponding online electronic calendars of the user and selected vehicle repair shop;

send a notification regarding the maintenance appointment corresponding to the issue with the subsystem of the vehicle to the user of the vehicle via a network, the notification including at least the date, the time, and the location of the maintenance appointment corresponding to the issue detected in the subsystem of the vehicle;

collect user feedback from the user of the vehicle regarding the maintenance appointment; and retrain the set of machine learning models utilizing the user feedback collected from the user of the vehicle to increase predictive accuracy of the set of machine learning models and provide proactive detection by addressing maintenance issues to prevent vehicle breakdown and accidents caused by failure of one or more vehicle subsystems.

9. The computer system of claim 8, wherein the processor further executes the program instructions to:

determine whether the maintenance appointment corresponding to the issue detected in the subsystem of the vehicle is needed prior to the vehicle arriving at a destination; and schedule the maintenance appointment corresponding to the issue with the subsystem of the vehicle at a nearest available vehicle repair shop prior to the vehicle arriving at the destination in response to determining that the maintenance appointment corresponding to the issue detected in the subsystem of the vehicle is needed prior to the vehicle arriving at the destination.

10. The computer system of claim 8, wherein the processor further executes the program instructions to:

receive a confirmation regarding the maintenance appointment corresponding to the issue detected in the subsystem of the vehicle from the user of the vehicle via the network.

11. The computer system of claim 8, wherein the processor further executes the program instructions to:

collect the data regarding performance of each subsystem from a plurality of subsystems from the IoT sensor system onboard the vehicle via the network.

12. The computer system of claim 11, wherein each subsystem of the plurality of subsystems corresponding to the vehicle includes a corresponding set of IoT sensors of the IoT sensor system.

13. The computer system of claim 8, wherein the processor further executes the program instructions to:

receive an input to establish a wireless connection with the vehicle via the network from the user of the vehicle;

establish the wireless connection with the vehicle via the network in response to receiving the input;

receive a registration of the vehicle for a vehicle maintenance management service provided by the computer system from the user of the vehicle via the network; and generate a record corresponding to the vehicle in a vehicle maintenance data structure of the vehicle maintenance management service in response to receiving the registration of the vehicle, wherein the record corresponding to the vehicle includes identifier of the user of the vehicle, identifier of the vehicle, the driving behavior of the user of the vehicle, vehicle subsystem condition to include identifier of the subsystem and condition of the subsystem, the issue with the subsystem, identifier of the selected vehicle repair shop, available times for the maintenance appointment, scheduled time for the maintenance appointment, and confirmation of the maintenance appointment.

14. A computer program product for dynamic vehicle maintenance management, the computer program product comprising a computer-readable storage medium having program instructions embodied therewith, the program instructions executable by a computer to cause the computer to:

train a set of machine learning models to identify different driving behaviors, different subsystem maintenance patterns, and different subsystem issues based on historic data;

collect data on a continuous basis from an Internet of Things (IoT) sensor system that includes engine and powertrain subsystem sensors, fuel subsystem sensors, exhaust subsystem sensors, cooling subsystem sensors, electrical subsystem sensors, ignition subsystem sensors, transmission subsystem sensors, suspension subsystem sensors, steering subsystem sensors, brake subsystem sensors, Heating, Ventilation, and Air Conditioning subsystem sensors, audio subsystem sensors, lighting subsystem sensors, safety subsystem sensors, navigation subsystem sensors, body and exterior subsystem sensors, interior subsystem sensors, and tire and wheel subsystem sensors onboard a vehicle;

analyze, utilizing the set of machine learning models, the data collected on the continuous basis from the IoT sensor system onboard the vehicle to detect driving behavior of a user of the vehicle as one of cautious, defensive, aggressive, and reckless based on speed, acceleration, and braking of the vehicle by the user and to detect an issue with a subsystem of the vehicle;

determine a customized maintenance schedule for the vehicle that takes into account the driving behavior of the user of the vehicle and the issue with the subsystem of the vehicle;

predict, utilizing the set of machine learning models, a potential subsystem failure based on the driving behavior of the user of the vehicle and the issue with the subsystem of the vehicle;

schedule a maintenance appointment proactively with a vehicle repair shop computer to repair the issue with the subsystem of the vehicle to increase performance of the vehicle, wherein the maintenance appointment corresponds to the issue with the subsystem of the vehicle at a date, time, and location based on availability of the user of the vehicle and a selected vehicle repair shop as detected in corresponding online electronic calendars of the user and selected vehicle repair shop;

send a notification regarding the maintenance appointment corresponding to the issue with the subsystem of the vehicle to the user of the vehicle via a network, the notification including at least the date, the time, and the location of the maintenance appointment corresponding to the issue detected in the subsystem of the vehicle;

collect user feedback from the user of the vehicle regarding the maintenance appointment; and retrain the set of machine learning models utilizing the user feedback collected from the user of the vehicle to increase predictive accuracy of the set of machine learning models and provide proactive detection by addressing maintenance issues to prevent vehicle breakdown and accidents caused by failure of one or more vehicle subsystems.

15. The computer program product of claim 14, wherein the program instructions further cause the computer to:

determine whether the maintenance appointment corresponding to the issue detected in the subsystem of the vehicle is needed prior to the vehicle arriving at a destination; and schedule the maintenance appointment corresponding to the issue detected in the subsystem of the vehicle at a nearest available vehicle repair shop prior to the vehicle arriving at the destination in response to the computer determining that the maintenance appointment corresponding to the issue detected in the subsystem of the vehicle is needed prior to the vehicle arriving at the destination.

16. The computer program product of claim 14, wherein the program instructions further cause the computer to:

receive a confirmation regarding the maintenance appointment corresponding to the issue detected in the subsystem of the vehicle from the user of the vehicle via the network.

17. The computer program product of claim 14, wherein the program instructions further cause the computer to:

collect the data regarding performance of each subsystem from a plurality of subsystems from the IoT sensor system onboard the vehicle via the network.

18. The computer program product of claim 17, wherein each subsystem of the plurality of subsystems corresponding to the vehicle includes a corresponding set of IoT sensors of the IoT sensor system.

19. The computer program product of claim 14, wherein the program instructions further cause the computer to:

receive an input to establish a wireless connection with the vehicle via the network from the user of the vehicle;

establish the wireless connection with the vehicle via the network in response to receiving the input;

receive a registration of the vehicle for a vehicle maintenance management service provided by the computer from the user of the vehicle via the network; and generate a record corresponding to the vehicle in a vehicle maintenance data structure of the vehicle maintenance management service in response to receiving the registration of the vehicle, wherein the record corresponding to the vehicle includes identifier of the user of the vehicle, identifier of the vehicle, the driving behavior of the user of the vehicle, vehicle subsystem condition to include identifier of the subsystem and condition of the subsystem, the issue with the subsystem, identifier of the selected vehicle repair shop, available times for the maintenance appointment, scheduled time for the maintenance appointment, and confirmation of the maintenance appointment.

20. The computer program product of claim 19, wherein the program instructions further cause the computer to:

enable the user to customize settings of the vehicle maintenance management service according to user preference for the vehicle.

* * * * *